Patented July 3, 1951

2,558,782

UNITED STATES PATENT OFFICE 2,558,782

CASTABLE REFRACTORIES

Temple W. Ratcliffe, Westfield, N. J., assignor to The Babcock & Wilcox Company, Rockleigh, N. J., a corporation of New Jersey No Drawing. Application September 8, 1947, Serial No. 772,897

17 Claims. (Cl. 106—64)

1

The present invention relates in general to the manufacture of castable refractories, and more particularly to improvements in the composition of dry unfired refractory materials capable of use in a castable consistency to form a refractory concrete having a maximum service use temperature approximating 3000–3100° F.

Such refractories are adapted for use in the construction of furnace linings where the lining is directly exposed to flame temperatures. Where, for example, it is desired to provide a refractory lining for furnace wall water tubes carrying metal projections, it has been customary to use a relatively stiff mixture of a crome ore base refractory, a binder or setting agent, and water, manually pounded or rammed into place on or between the water tubes. The laborious and time consuming character of such applications has resulted in high installation costs. The permissible service use temperature of such refractories is substantially below 3000° F. unless a calcium aluminate hydraulic cement is used as the binder, and particularly a high alumina cement, such as tri-calcium penta-aluminate ($3CaO.5Al_2O_3$). Both chrome ore and high alumina cement are high cost constituents and the resulting refractory mix is expensive.

Experience has shown that castable of moldable refractories for such service conditions should have certain physical properties to be most effective in application and use. When water is added to the dry mix, the wetted mix should have sufficient body and plasticity to be easily puddled or worked into the mold to fill out all corners and reproduce all mold details. A further desirable property of such castable refractories is a high degree of dimensional stability, with not only a small shrinkage on the initial firing of the material, but also a low reheat shrinkage. Another desirable property is a high spalling resistance, i. e. the ability to resist severe and repetitive temperature changes without development of cracks in the molded structure. A melting point above the expected maximum service use temperature is obviously essential for the desired refractoriness of the refractory mix, while a short setting time, high setting strength and a high hot load strength are desirable but of lesser importance.

The main object of my invention is the provision of a relatively low cost dry refractory composition which is capable of use when wetted to a castable consistency to form a refractory concrete having a maximum service use temperature approximating 3000–3100° F. A further and more specific object is the provision of an alumina-silica base refractory mix which when mixed with water to a castable consistency can readily be troweled on or cast against forms to produce a refractory concrete which is equal or superior in refractoriness to the firebrick used in the structure. A further specific object is the provision of a castable refractory mix which will produce a refractory concrete having excellent volume stability from its molded dimensions to its dimensions when heated to any temperature between room temperature and approximately 3050° F. A further specific object is a provision of a kaolin base castable refractory mix having substantially zero spalling characteristics throughout its service use temperature range and a melting point above 3100° F.

In accordance with my invention, the foregoing objects are achieved by a composition consisting substantially entirely of 70–85% by weight of a special alumina-silica grog, 3–15% by weight of crushed raw cyanite, and 15–30% by weight of bonding materials consisting of pulverized raw clay and a high alumina hydraulic cement. The grog employed can be high temperature calcined kaolin, bauxite or cyanite grog, alone or a blended mixture thereof, proportioned so that together with the other alumina-containing constituents of the mix it will form a refractory concrete whose alumina ($Al_2O_3$) content after molding and firing will be between 55% and 65% by weight, and preferably approximately 60%. I have found that an alumina content in the prescribed critical range not only contributes to a high spalling resistance, but also provides an excellent volume stability to the fired concrete. Below this alumina content range the spalling resistance is poor, and above this range the volume stability rapidly decreases until the alumina content reaches approximately 85%.

In crushing the grog and raw cyanite, it is important that close control be exercised over the size particles of these materials utilized. The materials should be so sized that not more than 8% by weight of these blended materials will pass through a Tyler standard 150-mesh screen with a minimum of 80–95% passing through a Tyler standard 4-mesh screen. I have found that if the blended grog and/or cyanite fines are in excess of the amount noted, excessive and marked shrinkage will take place at a temperature approximately 150 to 200° F. lower than the use temperature limit obtained if the fines are not present in such amounts. The described grog sizing also contributes to a high spalling resistance as it results in the formation of an open structure of substantially non-siliceous material in the concrete, thus preventing the development of a large percentage of glassy phase material. By having the grog grain sizing in the desired range, the plasticity of the wetted mix is enhanced and the molded concrete will have the desired density.

The raw cyanite included is crushed to pass through a 35-mesh Tyler screen and is from 3–15%, and preferably approximately 7%, of the batch weight. The cyanite contributes to the volume stability of the cast material by offsetting by its expansion, the shrinkage of the other constituents which would otherwise occur in the temperature range from 2400 to 2600° F.

The high alumina hydraulic cement employed should have a chemical analysis in the range of:

| | Per cent by weight |
|---|---|
| CaO | 23 to 26 |
| $Al_2O_3$ | 70 to 75 |
| $SiO_2$ | Less than 2 |
| $Fe_2O_3$ | Less than 1 |

For example, a satisfactory cement has been employed having the following chemical analysis:

| | Per cent by weight |
|---|---|
| CaO | 24.3 |
| $Al_2O_3$ | 73.7 |
| Silica | 1.5 |
| $Fe_2O_3$ | 0.3 |
| MgO | 0.2 |

A cement of this character can be advantageously made by bonding together the following materials:

| | Per cent |
|---|---|
| Lightly calcined aluminum hydrate | 59.8 |
| Low $MgCO_3$ calcium carbonate | 32.2 |
| Plaster of Paris | 8.0 |

The aluminum hydrate has a Tyler screen analysis of 1–4% on a 100-mesh screen, and the remainder through a 100-mesh screen. The calcium carbonate has a maximum of 2–3% of +325 mesh by wet screening. The plaster of Paris has 80% through 325-mesh by wet screening. Water equivalent to 51% by weight of the dry materials is added to the previously dry mixed materials and thoroughly wet mixed, after which the resultant slurry is placed in molds. The plaster of Paris develops a set in the molds in approximately 3–20 minutes and the molded pieces are then removed from the molds and set in a kiln with or without previous drying. The use of plaster of Paris in the cement permits its firing in the form of slugs which can be readily handled. The material is sintered at a temperature of approximately 2940° F. for one hour, removed from the kiln, and crushed and pulverized so that substantially all of it passes through a standard 325-mesh screen. I have found it advantageous to use from 8–18% by weight of the described cement in my castable refractory, with the amount at or approaching the maximum when the higher temperature use limit is desired. If less than 8% cement is used, the set strength of the concrete would be too low. Melting point cones made of this cement were found to have a melting point of 3080° F. The setting time of the cement was determined by standard tests and found to be an initial set of four hours and a final set of six hours.

I have found it desirable, contrary to ordinary refractory practice, to limit the amount of pulverized clay (200-mesh) included in the mix to a range between 2 and 8% of the total batch weight, preferably pulverized raw Georgia kaolin and 3% by weight. A mix having a clay percentage in excess of 8% was found to hinder and retard the set of the cement. Only sufficient clay is added to the mix to prevent the loss of the cement fines due to leakage of water from the mold and to aid in the workability of the mix. Without the clay addition, the added water was found to drain freely from the wet mix while in the mold and the resultant loss of cement fines prevented the resulting refractory concrete from developing its full set. The clay constituent of the mix thus prevents the water draining from the cast piece and reduces the amount of the relatively expensive cement required, while at the same time it maintains the workability of the mix and aids in the setting of the cement.

The high temperature kaolin base castable mix of my invention thus has the following general batch composition:

| | Per cent by weight |
|---|---|
| High temperature calcined alumina-silica grog or grogs—4 mesh | 70–85 |
| Crushed raw cyanite—35 mesh | 3–15 |
| Pulverized raw clay—200 mesh | 2–8 |
| Pulverized tri-calcium penta-aluminate cement—325 mesh | 8–18 |

Examples of batch mixes of my improved refractory castable are:

Castable A

| | Per cent by weight | $Al_2O_3$% (by weight) |
|---|---|---|
| 4 mesh high temperature calcined kaolin grog | 44.2 | 44.5 |
| 4 mesh high temperature calcined domestic bauxite grog | 30.8 | 74.4 |
| 35 mesh raw cyanite | 7.0 | 59.0 |
| 200 mesh raw kaolin | 3.0 | 38.5 |
| 325 mesh tri-calcium penta-aluminate cement | 15.0 | 75.0 |

Castable B

| | Percent by weight |
|---|---|
| 4 mesh high temperature calcined kaolin grog | 36.5 |
| 4 mesh high temperature calcined domestic bauxite grog | 36.5 |
| 35 mesh raw cyanite | 7.0 |
| 200 mesh raw kaolin | 5.0 |
| 325 mesh tri-calcium penta-aluminate cement | 15.0 |

The castable or moldable material described is sold commercially in a dry ready mixed form, it being necessary to add only clean fresh water to form a refractory concrete. The amount of water to be added to the mix will depend somewhat upon the size and shape of the piece to be cast. For a large piece, the mix should be somewhat stiff; for a smaller or complicated shape a slightly wetter consistency is desirable. In all cases it should be such that the mix will completely fill all corners of the form when worked with a rod. It is extremely important that thorough mixing be carried out as there may be some tendency in mixing to a stiff consistency for segregation to occur. As a general guide about 1.6 gallons of water (13.1 lbs.) is required per hundred lbs. of dry mix. The wet mix may be poured into forms like ordinary concrete. The mold or form should not be removed until a hard set has taken place. The described castable mix will set up in about six hours, but it is recommended that the forms be left on for twenty-four hours. The concrete should be maintained in a humid atmosphere while setting, such as by surrounding the same with damp sacks close to but out of contact with the concrete. Small shapes of the castable mix may be fired after forty-eight hours of natural drying, provided the heat is supplied slowly. Larger masses should be dried thoroughly with a slow fire, and the temperature then should be raised gradually.

During the firing of this material the high alumina hydraulic cement will maintain the volume dimensions of the material uniform up to a temperature of approximately 2000° F., where the strength of the cement is practically depleted with no great strength having yet been developed in the ceramic bond. The shrinkage that tends to occur in such a body between 2000 and 2400° F. is offset by the expansion of the raw cyanite constituent in the temperature range between 2400 and 2600° F. Shrinkage would then tend to occur in the kaolin grog constituent, and this in turn is offset by the reaction of the corundum crystals in the bauxite grog with the excess silica, i. e. above the mullite ratio, in the kaolin grog and clay, forming additional mullite by this reaction. This reaction results in an expansion which maintains the volume stability of the material to a temperature of 3000–3050° F.

The properties of the described kaolin base castable have been established by extensive tests as follows:

| | |
|---|---|
| Use limit in °F | 3,000 |
| Melting point in °F | 3,085 |
| Water in gallons to pour 1 cu. ft. of concrete in place | 2.0 |
| Water in gallons to mix 100# dry castable | 1.6 |
| Weight in lbs. of dry castable to pour 1 cu. ft. of concrete in place | 129 |
| Weight in lbs./cu. ft. of cast concrete: | |
| As molded | 146 |
| Dry | 131 |
| After firing | 127 |
| Setting time, hrs | 6 |
| Linear shrinkage in percent at: | |
| 1000° F | −0.11 |
| 1500° F | −0.10 |
| 2000° F | −0.20 |
| 2500° F | −0.10 |
| 2800° F | −0.84 |
| 3000° F | +0.25 |
| Mechanical strength: | |
| Modulus of rupture in lbs./sq. in.— | |
| Dry | 399 |
| After firing for five hours to: | |
| 2000° F | 207 |
| 2500° F | 579 |
| 2800° F | 1,693 |
| 3000° F | 1,665 |
| Crushing strength in lbs./sq. in.: | |
| Dry | 776 |
| After firing for five hours to— | |
| 2000° F. | 464 |
| 2500° F. | 832 |
| 2800° F. | 3,294 |
| 3000° F. | 4,232 |
| Panel test: | |
| Reheat shrinkage in percent—24 hrs. each at 3000° F. and 2900° F. | 0 |
| Spalling loss in percent—10 cycles at 2650° F. after reheat shrinkage tests | 0 |

While in accordance with the provisions of the statutes I have disclosed herein the best embodiments of the invention now known to me, those skilled in the art will understand that changes may be made without departing from the spirit of the invention covered by my claims.

I claim:

1. A castable refractory mix consisting of 70–85% by weight of an alumina-silica refractory grog, 3–15% by weight of raw cyanite, and 15–30% by weight of a bonding medium therefor consisting substantially entirely of a pulverized mixture of raw bonding clay and tri-calcium penta-aluminate hydraulic cement, the alumina-bearing constituents of the mix being so proportioned that the alumina content of the mix after firing will be in the range of 55–65% by weight.

2. A castable refractory mix consisting of 70–85% by weight of an alumina-silica refractory grog, 3–15% by weight of crushed raw cyanite, and 15–30% by weight of a bonding medium therefor consisting substantially entirely of a pulverized mixture of raw bonding clay and tri-calcium penta-aluminate hydraulic cement, the alumina-bearing constituents of the mix being so proportioned that the alumina content of the mix after firing will be approximately 60% by weight.

3. A castable refractory mix consisting of 70–85% by weight of high temperature alumina-silica refractory grog, 3–15% by weight of crushed raw cyanite and a bonding medium therefor consisting substantially entirely of a pulverized mixture of 2–8% by weight of raw bonding clay and 8–18% by weight of tri-calcium penta-aluminate cement, the alumina-bearing constituents of the mix being so proportioned that the alumina content of the mix after firing will be in the range of 55–65% by weight.

4. A castable refractory mix consisting of 70–85% by weight of high temperature alumina-silica refractory grog, 3–15% by weight of crushed raw cyanite, and a bonding medium therefor consisting substantially entirely of a pulverized mixture of 2–8% by weight of raw bonding clay and 8–18% by weight of tri-calcium penta-aluminate cement, the alumina-bearing constituents of the mix being so proportioned that the alumina content of the mix after firing will be approximately 60% by weight.

5. A castable refractory mix consisting of approximately 75% by weight of alumina-silica refractory grog, approximately 7% by weight of crushed raw cyanite, and a bonding medium therefor consisting substantially entirely of a pulverized mixture of 3% by weight of raw bonding clay and 15% by weight of tri-calcium penta-aluminate cement, the alumina-bearing constituents of the mix being so proportioned that the alumina content of the mix after firing will be approximately 60% by weight.

6. A castable refractory mix having approximately the following batch composition:

| | Per cent by weight |
|---|---|
| 4 mesh high temperature calcined kaolin grog | 36.5 |
| 4 mesh high temperature calcined bauxite grog | 36.5 |
| 35 mesh raw cyanite | 7.0 |
| 200 mesh raw kaolin | 5.0 |
| 325 mesh tri-calcium penta-aluminate cement | 15.0 |

7. A castable refractory mix having approximately the following batch composition:

| | Per cent by weight |
|---|---|
| 4 mesh high temperature calcined kaolin grog | 44.2 |
| 4 mesh high temperature calcined bauxite grog | 30.8 |
| 35 mesh raw cyanite | 7.0 |
| 200 mesh raw kaolin | 3.0 |
| 325 mesh tri-calcium penta-aluminate cement | 15.0 |

8. A castable refractory mix capable when set and fired of withstanding temperatures up to 3000° F. with high volume stability throughout the temperature range, consisting of 70-85% by weight of an alumina-silica refractory grog, 3-15% by weight of crushed raw cyanite, and 15-30% by weight of a bonding medium therefor consisting substantially entirely of a pulverized mixture of raw bonding clay and a calcium-aluminate hydraulic cement substantially free from iron and silica compounds.

9. A castable refractory mix capable when set and fired of withstanding temperatures up to 3000° F. with high volume stability throughout the temperature range, consisting of 70-85% by weight of an alumina-silica refractory grog, 3-15% by weight of crushed raw cyanite, and 15-30% by weight of a bonding medium therefor consisting substantially entirely of a pulverized mixture of raw kaolin and a calcium-aluminate hydraulic cement substantially free from iron and silica compounds.

10. A castable refractory mix comprising 70-85% by weight of crushed high temperature alumina-silica refractory grog having at least 80-95% by weight less than 4-mesh and not more than 8% by weight of fines less than 150-mesh, 3-15% by weight of crushed raw cyanite, 2-8% by weight of pulverized raw clay, and 8-18% by weight of a high temperature calcium-aluminate cement substantially free from iron and silica compounds.

11. A castable refractory mix comprising 70-85% by weight of crushed high temperature alumina-silica refractory grog, 3-15% by weight of crushed raw cyanite, the grog and cyanite having at least 80-95% by weight less than 4-mesh and not more than 8% by weight of fines less than 150-mesh, 2-8% by weight of pulverized raw kaolin, and 8-18% by weight of tri-calcium penta-aluminate cement.

12. A refractory concrete capable when set and fired of withstanding temperatures up to 3000° F. without materially weakening or spalling and with high volume stability and having an alumina content from 55-65% by weight, formed from a mix comprising crushed alumina-silica grog from 70-85% by weight of dry materials, crushed raw cyanite from 3-15%, the grog and cyanite having fines less than 150-mesh forming not more than 8% by weight thereof, pulverized raw clay from 2-8%, pulverized calcium aluminate cement having a melting point above 3000° F. from 8-18%, and water sufficient for a castable consistency.

13. A refractory concrete capable when set and fired of withstanding temperatures up to 3000° F. without materially weakening or spalling and with high volume stability and formed from a mix comprising crushed alumina-silica grog from 70-85% by weight of dry materials, crushed raw cyanite from 3-15%, the grog and cyanite having at least 80-95% by weight less than 4-mesh and fines less than 150-mesh forming not more than 8% by weight thereof, pulverized raw kaolin from 2-8%, pulverized tri-calcium penta-aluminate cement from 8-18%, and water sufficient for a castable consistency.

14. A refractory concrete capable when set and fired of withstanding temperatures up to 3000° F. without materially weakening or spalling and with high volume stability and having an alumina content from 55-65% by weight, formed from a mix comprising a crushed alumina-silica grog from the group of kaolin, bauxite or cyanite grog, said grog being from 70-85% by weight of dry materials, crushed raw cyanite from 3-15%, the grog and cyanite having at least 80-95% by weight less than 4-mesh and fines less than 150-mesh forming not more than 8% by weight thereof, pulverized raw kaolin from 2-8%, pulverized tri-calcium penta-aluminate cement having a melting point above 3000° F. from 8-18%, and water sufficient for a castable consistency.

15. A castable refractory mix comprising crushed high temperature alumina-silica grog 70-85% by weight of the dry materials, crushed raw cyanite from 3-15% by weight, pulverized raw bonding clay from 2-8% by weight, and a calcium-aluminate cement substantially free from iron and silica compounds from 8-18% by weight, the alumina-bearing constituents of the mix being so proportioned that the total alumina content after firing will be in the range of 55-65% by weight.

16. A castable refractory mix comprising crushed alumina-silica grog selected from the group of high temperature calcined kaolin, bauxite and cyanite grogs, said grog being 70-85% by weight of the dry materials, crushed raw cyanite from 3-15% by weight, pulverized raw bonding clay from 2-8% by weight, and a high temperature calcium-aluminate cement substantially free from iron and silica compounds from 8-18% by weight.

17. A castable refractory mix comprising a blended mixture of crushed kaolin and bauxite grogs, said grog constituents being at least 70-85% by weight of the dry materials, crushed raw cyanite from 3-15% by weight, and a bonding medium therefor from 15-30% by weight and including a high temperature calcium-aluminate cement substantially free from iron and silica compounds, the alumina-bearing constituents of the mix being so proportioned that the total alumina content after firing will be in the range of 55-65% by weight.

TEMPLE W. RATCLIFFE.

REFERENCES CITED

The following references are of record in the file of this patent:

UNITED STATES PATENTS

| Number | Name | Date |
|---|---|---|
| 182,935 | Kieran | Oct. 3, 1876 |
| 2,043,249 | Jones | June 9, 1936 |
| 2,416,700 | Kocher | Mar. 4, 1947 |